(12) United States Patent
Dawes et al.

(10) Patent No.: US 6,488,414 B1
(45) Date of Patent: Dec. 3, 2002

(54) OPTICAL FIBER COMPONENT WITH SHAPED OPTICAL ELEMENT AND METHOD OF MAKING SAME

(75) Inventors: Steven B. Dawes, Corning, NY (US); Robert J. Hagerty, Corning, NY (US)

(73) Assignee: Corning Incorporated, Corning, NY (US)

(*) Notice: Subject to any disclaimer, the term of this patent is extended or adjusted under 35 U.S.C. 154(b) by 0 days.

(21) Appl. No.: 09/494,073

(22) Filed: Jan. 28, 2000

Related U.S. Application Data
(60) Provisional application No. 60/118,946, filed on Feb. 5, 1999.

(51) Int. Cl.[7] .................................................. G02B 6/36
(52) U.S. Cl. ............................. 385/79; 385/33; 385/61; 385/93; 385/141
(58) Field of Search .............................. 385/33, 49, 61, 385/79, 93, 123, 141

(56) References Cited

U.S. PATENT DOCUMENTS

| | | | |
|---|---|---|---|
| 4,067,937 A | | 1/1978 | Unno et al. |
| 4,137,060 A | | 1/1979 | Timmermann |
| 4,183,618 A | * | 1/1980 | Rush et al. ............... 350/96.18 |
| 4,240,849 A | | 12/1980 | Kurokawa et al. |
| 4,420,219 A | * | 12/1983 | Muchel .................... 350/96.18 |
| 4,425,375 A | | 1/1984 | Abramson |
| 4,531,810 A | * | 7/1985 | Carlsen ..................... 350/96.2 |
| 4,671,609 A | | 6/1987 | Khoe et al. |
| 4,814,118 A | | 3/1989 | Plummer et al. |
| 4,824,195 A | | 4/1989 | Khoe |
| 4,925,267 A | | 5/1990 | Plummer et al. |
| 4,980,700 A | | 12/1990 | Ng |
| 5,054,877 A | * | 10/1991 | Ortiz, Jr. et al. ............... 385/33 |
| 5,169,677 A | | 12/1992 | Sangyoji et al. |
| 5,240,488 A | | 8/1993 | Chandross et al. |
| 5,293,438 A | | 3/1994 | Konno et al. |
| 5,294,573 A | | 3/1994 | Haun |
| 5,402,510 A | | 3/1995 | Kalonji et al. |
| 5,480,687 A | | 1/1996 | Heming et al. |
| 5,481,633 A | | 1/1996 | Mayer |
| 5,526,455 A | * | 6/1996 | Akita et al. .................... 385/93 |
| 5,527,871 A | | 6/1996 | Tani et al. |
| 5,548,051 A | | 8/1996 | Michalczyk et al. |
| 5,686,548 A | | 11/1997 | Grainger et al. |
| 5,768,458 A | * | 6/1998 | Ro et al. ........................ 385/79 |
| 5,784,512 A | * | 7/1998 | Hensen ........................ 385/61 |
| 5,908,562 A | | 6/1999 | Ohtsu et al. |

FOREIGN PATENT DOCUMENTS

| | | |
|---|---|---|
| EP | 0 260 742 A1 | 9/1987 |
| EP | 0 320 887 A2 | 12/1988 |
| EP | 0 567 896 A1 | 4/1993 |
| EP | 0 759 569 A1 | 2/1996 |
| WO | WO 86/01150 | 8/1985 |

\* cited by examiner

*Primary Examiner*—Akm E. Ullah
*Assistant Examiner*—Jennifer Doan
(74) *Attorney, Agent, or Firm*—Walter M. Douglas; Philip G. Alden

(57) ABSTRACT

A method of making an in situ shaped optical element on the terminal end of an optical fiber, and the resultant optical fiber component for manipulating light entering or exiting the terminal end of an optical fiber. The in situ shaped optical element is preferably an inorganic-organic hybrid sol-gel material which is adhered to the terminal end of the optical fiber and shaped in place to define an optical element or surface.

44 Claims, 6 Drawing Sheets

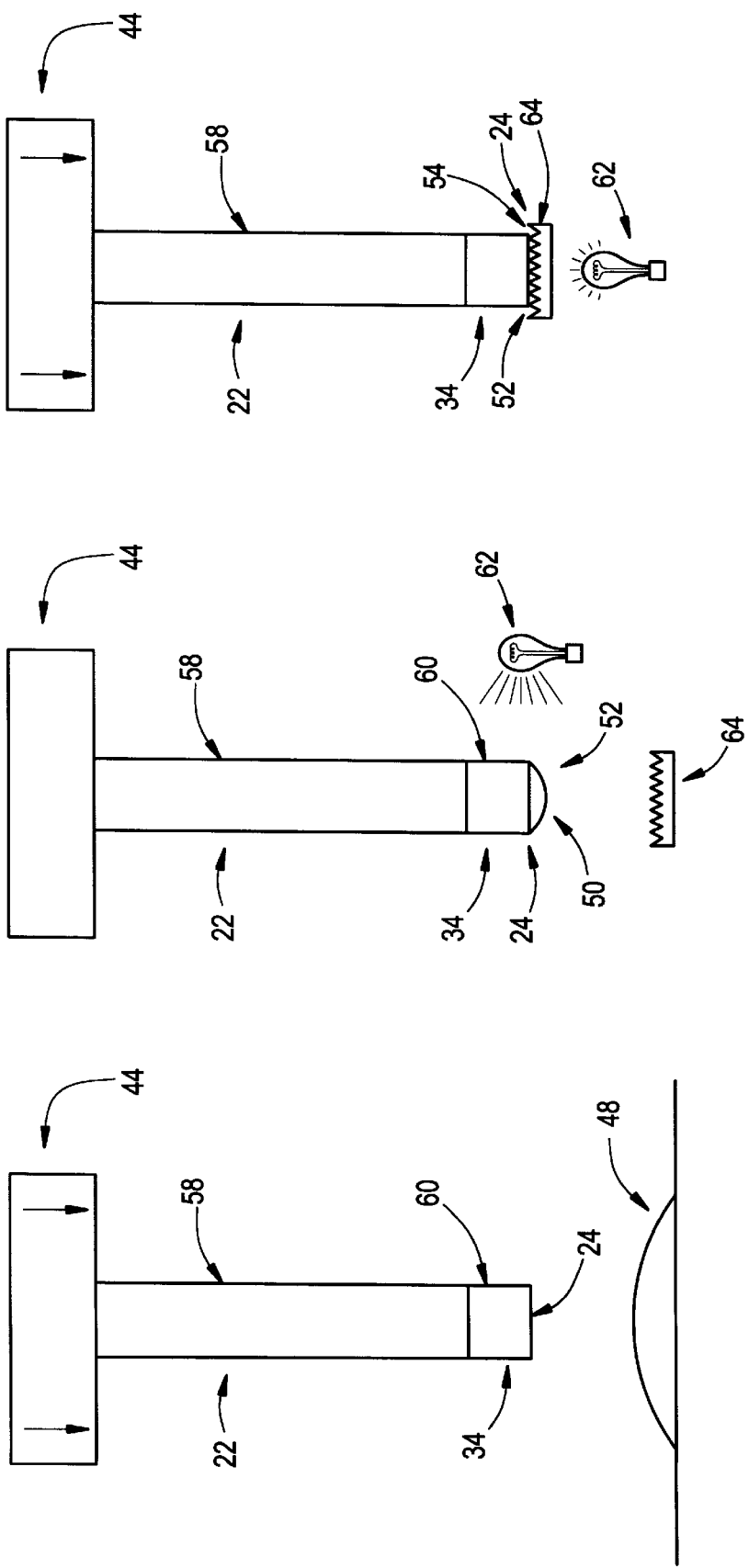

OPTICAL FIBER COMPONENT WITH SHAPED OPTICAL ELEMENT AND METHOD OF MAKING SAME

CROSS-REFERENCE TO RELATED APPLICATIONS

This application is based upon U.S. Provisional Application Serial No. 60/118,946 filed on Feb. 5, 1999, from which the benefit of priority pursuant to 35 USC §120 is hereby claimed, and the full content which is incorporated herein by reference as though fully set forth.

BACKGROUND OF THE INVENTION

1. Field of the Invention

The present invention relates to optical fiber components, and more particularly to shaped optical elements that manipulate light entering or exiting the terminal end of an optical fiber.

2. Technical Background

Coupling a beam of light (photons) into or out of an optical fiber is required when devices are introduced into the optical path of light propagating along optical fibers. Mode field mismatch, coupling efficiency, and back-reflections must be considered when such coupling is required.

Providing an economical and easily used method for coupling of light guided by optical fibers or light propagating unguided in free space or bulk optics has presented a challenge in the past. In photonic devices such as isolators, circulators, and thin film filters, it is often necessary for light to exit a first optical fiber and pass into an optical medium where the light is acted upon, and then couple the light back into a second optical fiber. The use of individual microlenses and methods such as polishing or melting the fiber ends has not provided as simple, efficient, and economical an approach as desired for coupling light at the terminal end of an optical fiber, particularly into or out of free space and bulk optics.

In light of the foregoing, there is a need for an optical element to couple light into and out of the terminal end of an optical fiber which will function effectively, is highly reproducible, and can be manufactured at a low cost.

SUMMARY OF THE INVENTION

The present invention is directed to optical components and a method for making optical components in which a shaped optical element is formed on or closely adjacent to the terminal end of an optical fiber, and particularly one which may be shaped in situ to form an optical element or surface to provide a desired performance or functionality in manipulating the light beam exiting or entering the optical fiber.

Additional features and advantages of the invention will be set forth in the description which follows, and in part will be apparent from the description, or may be learned by practice of the invention. The objectives and other advantages of the invention will be realized and attained by the devices, methods, apparatus, and compositions particularly pointed out in the written description and claims hereof as well as the appended drawings.

To achieve these and other advantages and in accordance with the purpose of the present invention, as embodied and broadly described, the invention includes an optical waveguide having a terminal end and an optical element adhered to the optical waveguide. The optical element has a shaped optical surface on its distal face, opposing the optical fiber.

In another aspect, the invention includes an optical waveguide component which includes an optical fiber having a terminal end which provides a port for photons guided through the optical fiber, and a sol-gel optical element attached to the optical fiber. The sol-gel optical element optically manipulates the photons guided through the optical fiber upon exiting or entering the optical fiber.

An additional aspect of the invention comprises a method for making an optical fiber component which includes adhering a viscous liquid precursor to the terminal end of the optical fiber, partially curing the precursor to form a deformable plastic solid optical element, shaping the deformable optical element into a shaped deformable plastic solid having an optical element shape, and fully curing the deformable plastic solid into a fully cured nondeformable solid optical element.

It is to be understood that both the foregoing general description and the following detailed description are exemplary and explanatory and are intended to provide further explanation of the invention as claimed.

The accompanying drawings are included to provide a further understanding of the invention and are incorporated in and constitute a part of this specification, illustrate several embodiments of the invention and, together with the description, serve to explain the principles of the invention. The invention includes both the devices made by the methods described herein, and the methods used to make those devices.

BRIEF DESCRIPTION OF THE DRAWINGS

The accompanying drawings, which are incorporated in and constitute part of this specification, illustrate embodiments of the invention and, together with the description, serve to explain the objects, advantages, and principles of the invention. In the drawings:

FIG. 11 is a side view of a device and method in which the present invention is embodied;

FIG. 12 is a side view of a device and method in which the present invention is embodied;

FIG. 13 is a side view of a device and method in which the present invention is embodied;

DETAILED DESCRIPTION OF THE PREFERRED EMBODIMENTS

The invention includes an optical waveguide device comprised of an optical waveguide having a terminal end and an optical element defining an in situ shaped optical surface. The optical surface is shaped as or while the optical element is adhered to the optical waveguide and cured.

Reference will now be made in detail to the present preferred embodiments of the invention, examples of which are illustrated in the accompanying drawings.

Figure 1:
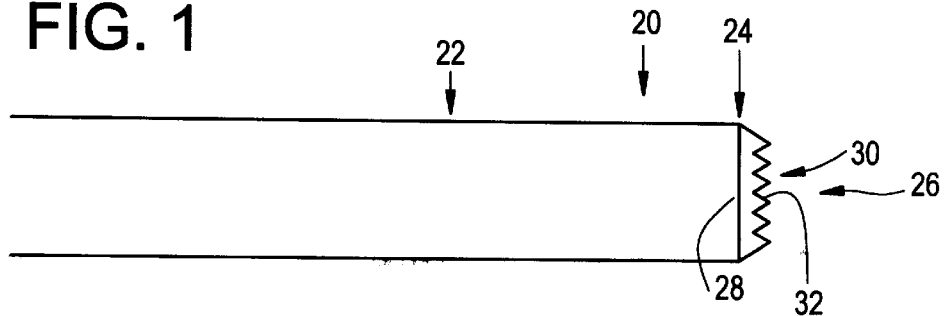
FIG. 1 is a side view of a device in which the present invention is embodied.

An exemplary embodiment of the optical waveguide device of the present invention is shown in FIG. 1 and is designated generally by reference number 20.

Figure 2:
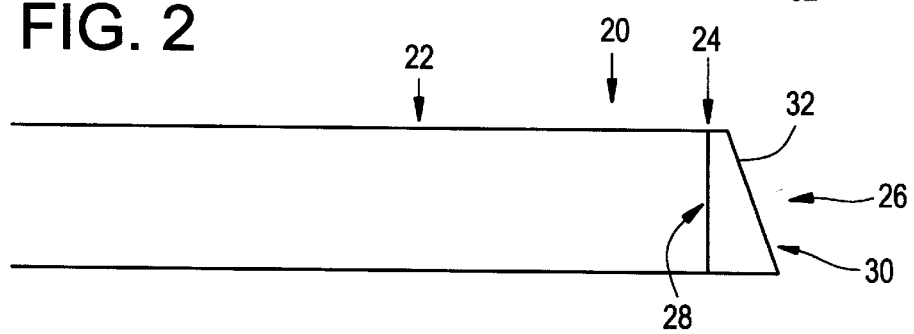
FIG. 2 is a side view of a device in which the present invention is embodied.
Figure 3:
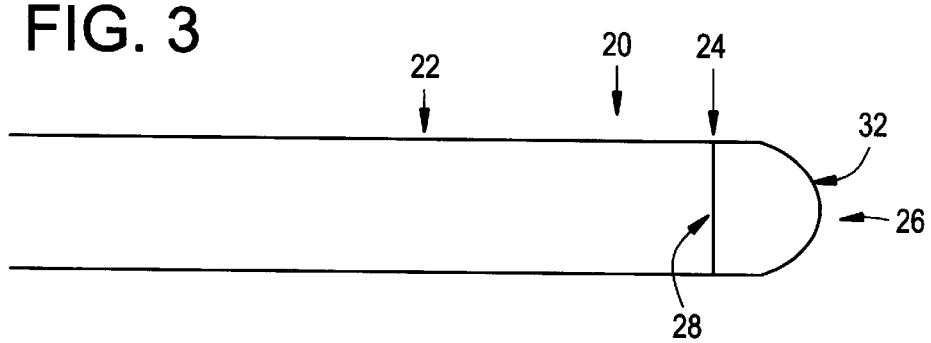
FIG. 3 is a side view of a device in which the present invention is embodied.

As embodied herein and referring to FIG. 1 optical waveguide device 20 includes an optical waveguide 22 having a terminal end 24. Optical waveguide 22 is preferably an optical waveguide fiber, such as a single mode optical fiber or a multimode optical fiber. Optical waveguide device 20 includes an optical element 26. Optical waveguide 22 is comprised of a first material, preferably a rigid brittle dielectric inorganic glass material, and optical element 26 is comprised of a second material, preferably an adherent deformable plastic material, which is pliable at a given ambient temperature at which the first material is brittle and rigid. The second material is different from the first material and is adherent to the first material. Preferably the first material is silica glass and the second material is a silica sol-gel material. Most preferably optical waveguide 22 is an optical fiber comprised of a silica glass core and cladding. As used herein, and in the field of optics, optical element refers to an optically transmissive article that manipulates, controls, directs, or focuses light (operates on photons entering and/or exiting the optical waveguide). Preferably the optically transmissive article is of an optically homogenous singular unitary integral material. Optical element 26 has a proximal end 28 and a distal end 30. Proximal end 28 is adjacent to terminal end 24. Proximal end 28 is adhered to optical waveguide terminal end 24. Distal end 30 of optical element 26 is comprised of post adhered insitu shaped optical surface 32 particularly suited for refractive optics, as shown in FIGS. 2 and 3.

Optical element 26 is a singular optically homogenous optical element that is adhered to terminal end 24. Insitu shaped optical surface 32 is shaped while optical element 26 is adhered to and in contact with optical waveguide 22 and terminal end 24. Insitu shaped optical surface 32 may be shaped insitu by embossing to provide an insitu embossed optical surface 32 particularly suited for diffractive optics, as shown in FIG. 1. Insitu shaped optical surface 32 may be shaped insitu with a mold to provide an insitu molded optical surface 32.

Optical element 26 is preferably a deformable plastic solid, wherein the deformable plastic solid is cured into a nondeformable solid. Preferably optical element 26 is comprised of a deformable plastic solid having a deformable plastic solid mass D and the deformable plastic solid is cured into a nondeformable solid having a nondeformable solid mass ND, with $D \geq ND \geq 0.95D$. Preferably optical element 26 is comprised of a deformable plastic solid having a volume V2, wherein the deformable plastic solid having the volume V2 is obtained from partially curing a viscous solvent-free precursor liquid having a volume V1, and the deformable plastic solid having the volume V2 is cured into a nondeformable solid having a volume V3, with $V2 \geq (0.95)V1$, preferably $V3 \geq (0.90)V1$, and preferably $V3 \geq (0.95)V2$. Most preferably the viscous solvent-free precursor liquid having a volume V1 is obtained from a fluid solvent-containing precursor liquid having a volume V0, wherein $0.5V0 \geq V1$.

The optical waveguide device 20 includes optical element 26 formed from a plastic material, with the plastic material adherent to optical waveguide terminal end 24. Preferably the plastic material is comprised of a curable deformable plastic material wherein a deformable distal end surface of optical element 26 is shaped with a shaped relief mold and the shaped deformable distal end 30 surface is cured to form shaped optical surface 32. Deformable distal end 30 surface of optical element 26 can be embossed with an embossing relief mold and the embossed deformable distal end 30 surface then cured to form embossed shaped optical surface 32.

Figure 4:
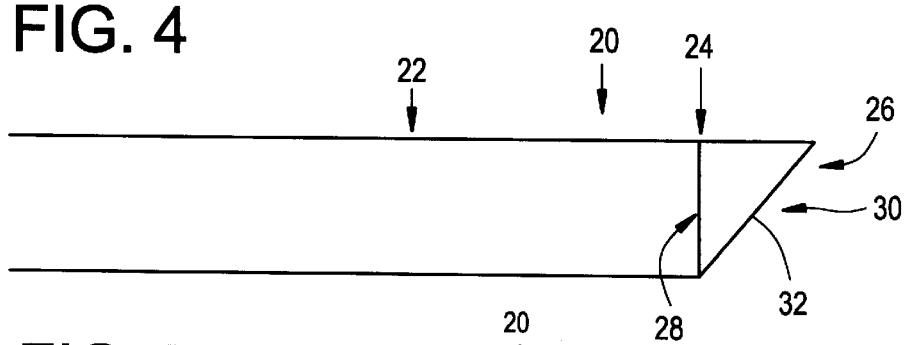
FIG. 4 is a side view of a device in which the present invention is embodied.

Optical element 26 has an optical shape that manipulates/directs light transmitted through it, that is entering/exiting the terminal end 24 of the optical waveguide 22. Preferably optical element 26 is a free space bulk optic. Optical element 26 is preferably comprised of a lens, such as a refractive lens, spherical lens, an aspherical lens, a fresnel lens, or a diffractive lens. FIG. 3 illustrates an optical waveguide device 20, wherein optical element 26 is comprised of a refractive spherical lens with shaped optical surface 32 having a hemispherical geometry. As shown in FIG. 2 and in FIG. 4, optical element 26 is comprised of an optical taper angle. The optical taper angle of FIG. 4 has a triangular shape and the optical taper angle of FIG. 2 has a trapezoidal shape. Such optical taper angle optical elements can be used to minimize back reflectance of an optical fiber terminus. As shown in FIG. 1, optical element 26 is comprised of micro-patterned features, which are preferably embossed into shaped optical surface 32. Optical element 26 can be embossed with micro-patterned features so that optical element shaped optical surface 32 provides a diffraction grating.

Preferably optical element 26 is formed from a sol-gel material, such as a silica sol-gel. Most preferably optical element 26 is formed from an inorganic-organic hybrid sol-gel material, preferably such that optical element 26 is comprised of solvent-free, polysilsequioxanes. The inorganic-organic hybrid sol-gel material of optical element 26 is comprised of an extended matrix containing silicon and oxygen atoms with at least a fraction of the silicon atoms in the extended matrix being directly bonded to substituted or unsubstituted hydrocarbon moieties. The inorganic-organic hybrid sol-gel material of the optical element is preferably comprised of silicon atoms wherein at least 1% of the silicon atoms are covalently bonded to at least one organic modifier. Preferably the organic modifier is comprised of a carbon atom. Preferably the organic modifier is an organic group having from one to eighteen carbon atoms. Such organic groups are ethyl, alkyl, phenyl, aryl, and methyl, and also methacryloxypropyl as a photocurable organic group. The inorganic-organic hybrid sol-gel material is preferably formed from at least one precursor selected from the group comprised of polydimethyl siloxane, ethyl triethoxysilane, methyltriethoxysilane, methacryloxypropyl triethoxysilane (photocurable), phenyltriethoxysilane, and a structural modifier including a fluorine atom such as phenyltrifluorosilane (PTFS).

The invention further comprises an optical waveguide device 20 comprised of an optical waveguide fiber 22 having a terminal end 24 providing a port for a plurality of photons guided with the optical fiber. Optical waveguide device 20 further includes a sol-gel optical element 26 in attachment with the optical fiber, wherein sol-gel optical element 26 optically manipulates the photons guided with the optical fiber. Preferably sol-gel optical element 26 is a free space lens which focuses photons, such as a spherical, fresnel, or diffractive lens. As shown in FIGS. 5–8, optical waveguide device 20 is a collimator, preferably with optical element 26 being a refractive lens. Optical fiber terminal end 24 of collimator 20 is comprised of a beam expander 34, which allows the light beam of photons guided by the core 36 of optical fiber 22, to expand and spread outward, such as illustrated by dotted beam expanding lines 38.

Figure 7:
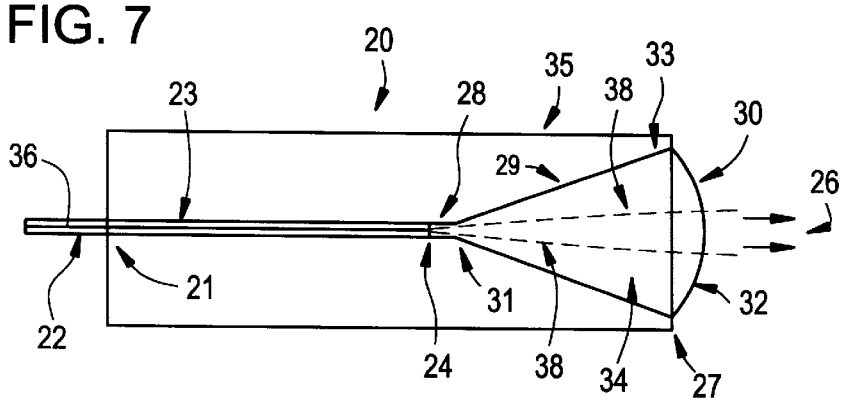
FIG. 7 is a side view of a device in which the present invention is embodied.

Preferably beam expander 34 is provided by a beam expanding portion of sol-gel optical element 26 contained within a beam expanding housing or ferrule 35. As shown in FIG. 7, beam expanding housing or ferrule 35 includes an optical fiber receiving end 21 and a fiber receiving tube void 23 which is sized such that optical fiber 22 can be inserted into beam expanding housing or ferrule 35 and secured therein. Housing or ferrule 35 has an optical element end 27 and an optical element receiving void 29. Optical element receiving void 29 includes a first end 31 proximate terminal end 24 and a second distal end 33 located at the optical element end 27 of the housing. As shown in FIG. 7. optical element receiving void 29 expands from first end 31 to second end 33 so that the beam expanding portion of optical element 26 contained by housing void 29 expands. Preferably optical element receiving void 29 and the respective matching beam expanding portion of optical element 26 are conical.

Figure 5:
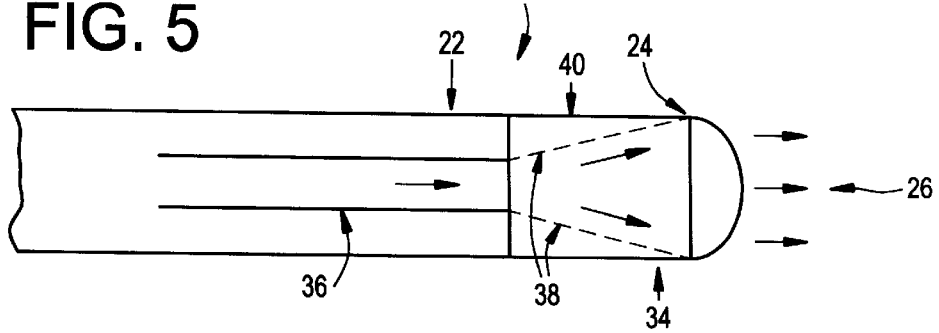
FIG. 5 is a side view of a device in which the present invention is embodied.
Figure 6:
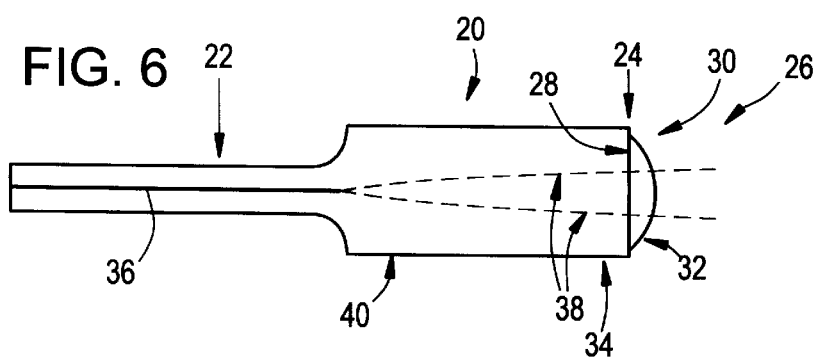
FIG. 6 is a side view of a device in which the present invention is embodied.

Alternatively, beam expander 34 is comprised of a silica waveguide member 40 having an expanded core, so that the diameter of the expanded core is greater than the diameter of optical waveguide fiber core 36. Preferably the expanded core silica waveguide member 40 is comprised of a silica blank cylinder stub adhered to optical fiber 22. Such a silica blank cylinder stub is a radially homogenous cylindrical silica member. The silica blank is undoped silica, or alternatively is doped silica, such as germanium doped silica which comprises the core of standard optical fibers. Most preferably the silica blank fiber is adhered to optical waveguide fiber 22 and fiber core 36 with a fusion splice. As shown in FIG. 5, the silica blank can have an outside diameter matching optical fiber 22 or can have an outside diameter greater than optical fiber 22, as shown in FIG. 6, to provide beneficial expansion of the beam while avoiding truncation of the beam. An alternative to having the silica blank fused on, the silica blank could be adhered with an adhesive composition, such as a sol-gel. Alternatively, expanded core silica waveguide member 40 may be comprised of a thermally expanded core, obtainable such as by thermally treating the end of silica optical fiber 22 so that core 36 expands or diffuses radially outward.

Figure 8:
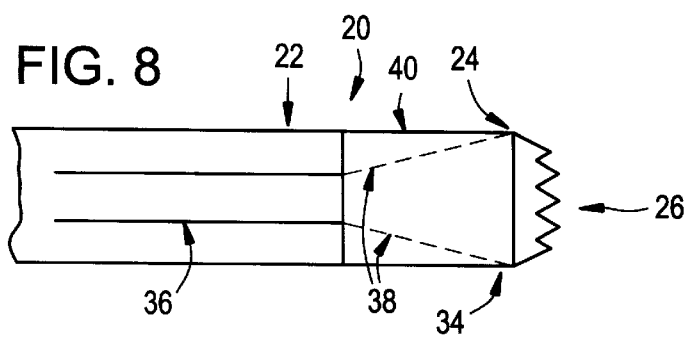
FIG. 8 is a side view of a device in which the present invention is embodied.

Preferably sol-gel optical element 26 comprises a shaped optical element, particularly wherein the shaped optical element is shaped while in attachment with the terminal end 24, thus providing a post-attachment insitu shaped optical element 26. Preferably sol-gel optical element 26 has a molded refractive optic lens shape such as in FIGS. 5–7. As shown in FIG.8, collimating optical waveguide device 20 may include a sol-gel optical element 26 comprised of an embossed surface 42.

Figure 9:
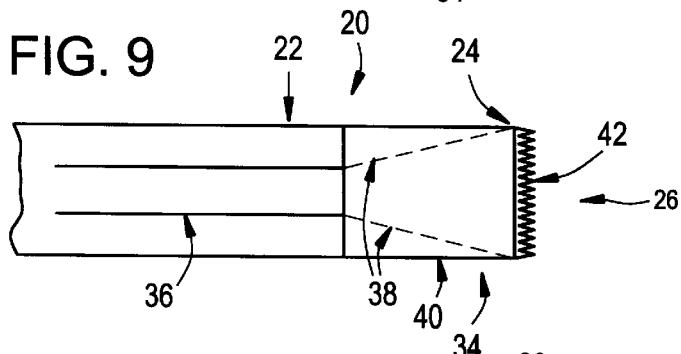
FIG. 9 is a side view of a device in which the present invention is embodied.
Figure 10:
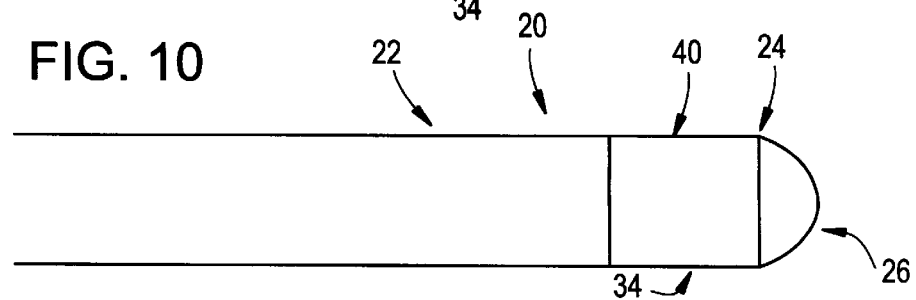
FIG. 10 is a side view of a device in which the present invention is embodied.

Sol-gel optical element 26 most preferably is attached to optical fiber 22, at terminal end 24, in a deformable plastic state and optical element 26 is shaped, such as by molding and/or embossing, while in attachment with optical fiber 22. Sol-gel optical elements 26 in FIG. 2 and FIG. 4 comprise optical tapers. Sol-gel optical elements 26 in FIG. 1, FIG. 8, and FIG. 9 are comprised of embossed micro-patterned features.

In a preferred embodiment of the invention, sol-gel optical element 26 is substantially inorganic, such as about 70% to 80% by weight inorganic. Most preferably sol-gel optical element 26 is an inorganic-organic hybrid sol-gel. The inorganic-organic hybrid sol-gel is preferably comprised of an extended matrix containing silicon and oxygen atoms with at least a fraction of the silicon atoms in the extended matrix being directly bonded to substituted or unsubstituted hydrocarbon moieties. Preferably the inorganic-organic hybrid sol-gel includes silicon atoms wherein at least 1% of the silicon atoms are covalently bonded to at least one organic modifier, with the organic modifier comprised of a carbon atom. Preferably the organic modifier is an organic group having from 1 to 18 carbon atoms, most preferably such as an alkyl, a phenyl, an aryl, an ethyl, a methyl or a methacryloxypropyl. The inorganic-organic hybrid sol-gel is preferably comprised of ethylsiloxane groups, methylsiloxane groups, phenyl-siloxane groups, methacryloxypropyl groups and fluorine, particularly wherein the sol-gel is formed from at least one precursor selected from the group comprised of polydimethyl siloxane, ethyltriethoxysilane, methyltriethoxysilane, phenyltriethoxysilane, methacryloxypropyltriethoxy silane and a structural modifier including a fluorine atom, (such as PTFS).

The invention further includes a method of making an optical waveguide fiber device including the steps of providing an optical waveguide fiber having a terminal end and adhering a viscous liquid optical element precursor, having a mass, to the optical fiber terminal end. When beam expanding housing or ferrule 35 is utilized to form a beam expander, the method includes providing a housing or ferrule 35 which has an optical waveguide fiber receiving void 23 and inserting optical waveguide fiber terminal end 24 into the optical fiber receiving void. Then the viscous liquid optical element precursor is adhered to terminal end 24 by filling optical element receiving void 29 with the viscous liquid optical element precursor. When a beam expanding housing is not utilized, as shown in FIG. 11, an optical waveguide fiber 22 is provided, such as by holding in a fiber holding chuck 44, with the terminal end 24 oriented proximate to a droplet 48 of a viscous liquid optical element precursor which is adherent to terminal end 24. Droplet 48 can be conveniently provided on a glass slide or other planar supporting substrate. Adhering a mass of viscous liquid optical element precursor to optical fiber terminal end 24 can be achieved by contacting terminal end 24 with the top of droplet 48.

After providing optical fiber 22 and adhering a viscous liquid optical element precursor 50 having a mass to terminal end 24, the method includes partially curing the viscous liquid optical-element precursor mass 50 to form a deformable plastic solid optical element precursor 52 having a mass. The invention further includes shaping the partially cured deformable plastic solid optical precursor 52 into a shaped deformable plastic solid optical element 54 having an optical element shape, particularly an optical element shape which is able to optically manipulate light, preferably when fully cured. The invention further includes fully curing the shaped deformable plastic solid optical element 54 into a fully cured nondeformable solid optical element having a mass, particularly wherein the fully cured nondeformable solid optical element optically manipulates photons guided with the optical fiber 22.

The step of providing an optical waveguide fiber having a terminal end may include providing a first optical waveguide fiber 58, cleaving first optical waveguide fiber 58, fusion splicing a second optical waveguide silica blank 60 to cleaved first optical waveguide fiber 58, cleaving second optical waveguide 60 to form terminal end 24 of optical waveguide fiber 22. First optical waveguide fiber 58 and fusion spliced second optical waveguide silica blank 60 are shown in FIGS. 11–13. Preferably second optical waveguide 60 is comprised of a silica blank, which is similar to first optical fiber 58 (standard optical fiber with raised index doped core 36, such as germanium doped core, cladded with a silica cladding) except that the silica blank does not have a raised index doped core profile. The invention utilizes second optical waveguide 60 as a beam expander to spread out a beam of light guided by the raised index doped core of first optical fiber 58, The spreading out of light is preferably achieved by cleaving second optical waveguide 60 at a distance from first optical fiber 58 which provides for beneficial spreading of a light beam guided by optical fiber 58.

The step of adhering a viscous liquid optical element precursor to the optical fiber terminal end, preferably comprises adhering a viscous liquid sol-gel to optical fiber terminal end 24, most preferably an inorganic-organic hybrid sol-gel. The inorganic-organic hybrid sol-gel adhered to the terminal end is preferably comprised of an extended matrix containing silicon and oxygen atoms with at least a fraction of the silicon atoms in the extended matrix being directly bonded to substituted or unsubstituted hydrocarbon moieties. At least 1% of the silicon atoms of the adhered hybrid sol-gel are covalently bonded to at least one organic modifier, particularly wherein the organic modifier is comprised of a carbon atom, most preferably the organic modifier is an organic group having from 1 to 18 carbon atoms.

The method of adhering a viscous liquid optical element precursor includes forming an inorganic-organic hybrid sol-gel from at least one precursor chemical selected from the group comprised of polydimethyl siloxane, methacryloxypropyl silane, triethoxysilane, phenyltriethoxysilane, and a structural modifier including a fluorine atom, such as PTFS. Most preferably the adhered hybrid sol-gel is comprised of methyl-siloxane groups, phenyl-siloxane groups, and fluorine or ethyl-siloxane groups, phenyl-siloxane groups, and fluorine. When a photo-curing of the inorganic-organic hybrid sol-gel is to be utilized, at least about 10%(molar) of the methyl or ethyl siloxanes in the composition should be replaced by a photo-curable alkoxysiloxane such as methacryloxypropyl siloxane. In addition to such a methacryloxypropyl siloxane substitution a photo-initiator is to be added to the composition to beneficially utilize photo-curing. Preferably the UV photo-curable alkoxysilane used is a methacryloxypropyl, and most preferably is methacryloxypropyl triethoxysilane or methacryloxypropyl trimethoxysilane.

The method includes providing a viscous liquid optical element precursor having a mass (per unit volume) by mixing a precursor chemical composition having a mass (per unit volume), hydrolyzing the precursor chemical composition to form a hydrolyzed sol fluid liquid having a mass, and drying the hydrolyzed sol fluid liquid in order to provide the viscous liquid optical element precursors. Preferably the mass (per unit volume) of the viscous liquid optical element precursor is less than 50% of the mass (per unit volume) of the hydrolyzed sol fluid liquid, in that drying the hydrolyzed sol fluid liquid comprises removing at least 50% of the mass (per unit volume) of the hydrolyzed sol fluid liquid (greater than 50% mass [per unit volume] loss from drying). Additionally, the mass (per unit volume) of the viscous liquid optical element precursor is less than 50% of the mass (per unit volume) of the precursor chemical composition, in that there is preferably at least 50% mass (per unit volume) loss from hydrolyzing and drying. Preferably less than 6% of the original mass (per unit volume) of the precursor chemical composition is removed in a solid state, most preferably less than 4% of the original precursor chemical composition mass (per unit volume) is lost while in a solid state.

It is preferred in practicing the method that the mass (per unit volume) of the deformable plastic solid optical element precursor is at least about 94% of the mass (per unit volume) of the mass (per unit volume) of the adhered viscous liquid optical element precursor. Additionally, it is advantageous to have the mass (per unit volume) of the fully cured nondeformable solid optical element be at least about 90% of the mass of the adhered viscous liquid optical element precursor.

As shown in FIG. 11, the adhering of a viscous liquid optical element precursor to terminal end 24 may comprise contacting terminal end 24 to a bead 48 of the viscous liquid optical element precursor so that the viscous liquid optical element precursor fully wets terminal end 24 and forms a convex meniscus as shown in FIG. 12.

The method of curing the optical element precursor preferably includes substituting methacryloxypropyl alkoxysilane for methyl or ethyl alkoxysilanes in the optical element precursor composition, introducing a UV (ultraviolet) curing agent into the optical element precursor composition and curing the precursor with exposure to UV radiation. Compositions used with UV curing require 10% molar of the siloxane precursors to be UV polymerizable hybrids, such as methacryloxypropyl substituted alkoxysilanes. The method step of partially curing the adhered viscous liquid optical element precursor includes exposing the precursor for a short duration to UV light radiation. As shown in FIG. 12, viscous liquid element precursor 50 is partially cured by UV light radiation from energy source 62 such as ELC 600 brand_UV light source (Electrolite Corp., Danbury, Conn.) for a relatively short exposure time of about 30 seconds.

The method step of partially curing the adhered viscous liquid optical element precursor alternatively (preferably when beam expander housing 35 is utilized) includes heating the adhered viscous liquid optical element precursor, particularly heating for a time of about 5 minutes to about 1 hour at a temperature from about 60° C. to about 100° C. As shown in FIG. 12, viscous liquid element precursor 50 can be partially cured by heating with an appropriate heat output from energy source 62 while vertically oriented at the bottom terminal end 24 of waveguide 22 held in fiber chuck 44.

When device 20 includes beam expanding housing 35, it is preferred that the hybrid sol-gel is comprised of ethylsiloxane groups instead of methyl-siloxane groups. The ethyl-siloxane groups is preferred in such devices where the optical path length through optical element 26 is relatively long since the replacement of methyl-siloxanes with ethyl-siloxanes reduces absorption at 1550 nm. Such ethyl-siloxane groups are achieved with ethyltriethoxysilane. Such methyl-free ethylsiloxane (ethyltriethoxysilane) compositions require heat treatment curing instead of UV curing, in that siloxanes with methacrylate groups (such as methacryloxypropyl siloxane) are purposely excluded from the composition. Such exclusion of methacryloxypropyl siloxane excludes photo-curing. When methacryloxypropyl siloxane is absent, both ethyl and methyl siloxanes require thermal curing processes.

The method step of shaping the partially cured deformable plastic solid optical element precursor into a shaped deformable plastic solid optical element having an optical element shape comprises molding the deformable plastic solid with a mold having an optical element shape. Additionally shaping may comprise embossing the partially cured deformable plastic as shown in FIGS. 12 and 13. Shaping the partially cured deformable plastic 52 includes shaping with negative master plate 64, such as a transparent silica negative master plate or a nickel negative master plate. Preferably the negative master plate is comprised of an etched negative relief surface of the optical element shape. Such etched surfaces can be provided by photolithography, laser ablation, or reactive ion etching.

Fully curing the shaped deformable plastic solid optical element into a fully cured nondeformable solid optical element preferably includes exposing the shaped deformable plastic solid optical element to a sufficient concentration of UV light radiation for a sufficient time to cure the optical element into a nondeformable solid optical element. As shown in FIG. 13, the shaped deformable plastic solid optical element is exposed through UV transparent master plate 64 with UV light radiation from energy source 62, such as with an energy of about 80,000 $MJ/cm^2$ (an ELC 600 brand UV light source for about 15 minutes).

Fully curing the shaped deformable plastic solid optical element into a fully cured nondeformable solid optical element alternatively (preferably for non-photo-curing applications such as when beam expander housing 35 is utilized) includes heating the shaped deformable plastic solid optical element for a time at a temperature sufficient to cure the shaped deformable plastic solid optical element into a nondeformable solid optical element. Fully curing comprises heating the deformable plastic solid for at least 3 minutes at a temperature of at least 150° C., preferably with the temperature in the range from 200° C. to 325° C., and most preferably from 200° C. to 300° C. Preferably heating comprises heating for a time in the range of 3 minutes to 7 minutes and most preferably from 4 minutes to 6 minutes. Generally photo-curing is sufficient to cure from a plastic state to an elastic state, but additional thermal curing (at least 15 minutes at 150° C. to 200° C.) is beneficial to insure full curing into a nondefornable solid.

In one embodiment of the invention the steps of shaping and fully curing are performed consecutively, with fully curing after shaping. In a preferred embodiment the steps of shaping and fully curing are performed concurrently, such as shaping the partially cured deformable plastic with a UV transparent negative master plate combined with a UV energy source or a heated negative master plate. FIG. 13 shows a transparent negative master plate 64 (for embossing deformable plastic solid 52 into shaped deformable plastic solid 54), with a UV light source 62 (alternatively a heat source for heat curing) to provide a negative master plate/energy source combination for concurrent shaping and curing. With the preferred concurrent UV molding/curing method the fiber is moved to the mold so appropriate shaping is achieved while appropriate UV radiation exposure fully cures the partially cured precursor. With heated master plate 64 the plate is heated to a temperature of at least 220° C., and shaping the partially cured deformable plastic with the heated negative master plate includes shaping the partially cured deformable plastic with the heated negative master plate for at least 3 minutes, and most preferably from 4 to 6 minutes.

The method step of shaping includes shaping the partially cured deformable plastic solid optical element precursor into a lens. Shaping the partially cured deformable plastic solid optical element precursor into a lens comprise embossing to form an embossed diffractive optics lens such as a diffractive lens or a fresnel lens having micro-features or molding to form a molded refractive optics lens such as a spherical lens or an aspherical lens. Additionally, the method step of shaping includes shaping the partially cured deformable plastic solid optical element precursor into an optical element such as a diffraction grating or an optical taper.

The invention is particularly suited for making a free space (gas medium) collimator for collimating light guided in an optical waveguide fiber. The method of shaping the partially cured deformable plastic solid optical element precursor includes shaping into a collimator. The preferred collimator of the invention utilizes a beam expander collimator device 20 such that optical element 26 has a beam expander 34 portion in addition to the molded refractive lens portion provided by insitu shaped optical surface 32, as shown in FIG. 7. Alternatively, as shown in FIGS. 5 and 6, beam expander 34 can be a separate member from the molded refractive lens optical element 26. Additionally, as shown in FIG. 13, a collimator at the end of optical fiber 22 may be made by embossing a lens on the terminal end 24 of beam expander 34, which is a silica blank fusion spliced to optical fiber 58.

The method involves the steps of synthesizing an appropriate inorganic-organic hybrid sol-gel derived solvent free precursor material, placing the solvent free precursor material in contact with the fiber, partially curing the material, forming the desired optical shape by embossing or molding the partially cured material, and completely curing the material. Synthesizing an appropriate sol-gel preferably provides a sol-gel material comprised of polysilsequioxanes. Appropriate inorganic-organic hybrid sol-gel derived precursor materials are described in patent applications PCT/US97/22760 by Dawes et al, PCT/US97/21315 by Dawes et al., and U.S. Ser. No. 60/033,961 by Dawes, which are hereby incorporated by reference. Inorganic-organic hybrid sol-gel materials are preferred in the present invention. The index of refraction of the inorganic-organic hybrid sol-gel materials can be synthetically controlled and they provide beneficial optical transmission in the 1310 and 1550 nm optical telecommunication windows, especially high transmission in the 1550 window. Most importantly shrinkage and consolidation of the inorganic-organic hybrid sol-gels is beneficially controlled in that little mass loss occurs during curing and most of the mass is lost in a non-solid state. The use of photocurable siloxanes and UV curing agents (photo-initiators) in the inorganic-organic sol-gel composition provides for UV curing of the sol-gel. Additionally with inorganic-organic sol-gel materials thermal curing develops the optical element into a durable rigid nondeformable solid. In addition to the inorganic-organic hybrid sol-gels, the optical elements may be comprised of other sol-gel materials which do not have large volume reductions during condensation and which are not prone to cracking during curing.

Preferably an amount of the appropriate sol-gel material is applied to the terminal end of a fiber by contacting the fiber with the sol-gel material, such as by placing a small bead of the viscous sol-gel material on a glass slide positioned under a fiber chuck or by filling the beam expander housing with the viscous sol-gel material. As shown in FIG. 11 the cleaved fiber 22 can be gripped in the chuck and fixed perpendicular to the plane of the glass slide. The fiber terminal end is then carefully contacted to the top of the droplet and the sol-gel material is allowed to fully wet the fiber terminal end surface. A microscope is useful in optically monitoring this procedure and ensuring that only a meniscus is formed and that the fiber is not immersed into the sol-gel. Then the fiber can be withdrawn from the bead. The size of the drop that forms on the fiber is dependent on the viscosity, surface tension and age of the sol-gel material, and also the rate at which the fiber is withdrawn from the bead. In practicing the invention the drop forms a spherical section extending 25 to 30 microns from the cleaved edge of a fiber, with a radius of curvature of about 70 to 110 microns, with the volume of the droplet estimated at about a nanoliter or less.

Then the viscous sol-gel material is partially cured by UV exposure (about 30 seconds with an ELC 600 brand UV light source) or by heating the tip of the fiber to a temperature in the range of 60° to 100° C. for a time of five minutes to an hour. This can be done while the fiber is mounted in a chuck by impinging UV radiation or heat on the fiber. Alternatively the fiber can be placed in a heated environment such as an oven to partially cure the sol-gel material.

Next the partially cured sol-gel material can be formed into a desired optical shape. Preferably the fiber is still mounted in a chuck and is lowered onto the surface of a master plate, which has the negative of the desired optical shape etched onto it. The master plate can be made of silica or nickel or other appropriate template material which can provide the negative image of the desired optical shape. Additionally the master plate can be coated with a release agent, for example Teflon, to aid in the release of the shaped optical element. Preferably the fiber is pushed perpendicularly into the master plate and the partially cured sol-gel material is allowed to fully penetrate the negative relief of the master plate, and is held in place for a period of time and then withdrawn. Preferably the partially cured sol-gel material is fully cured with UV light while in contact with the masterplate (15 minutes with ELC 600 brand UV light source).

Alternatively, during or after such shaping, the shaped partially cured sol-gel material may be thermally cured by heat treatment with a temperature between about 150° to 300° C. in order to fully cure the optical element. Such full thermal curing can be accomplished by placing the shaped optical element article into an oven and ramping up to the required temperature followed with a several minute hold before cooling. Alternatively full thermal curing can be done with the shape optical element held in a chuck by exposing the element end to a radiant heat source, for example a heat source such as a $CO_2$ laser. Preferably for thermal curing of the precursor, full thermal curing is accomplished during the shaping step by heating the master to a temperature of $\geq 220°$ C. and pressing the partially cured sol-gel material into the heated master for about five minutes. Such a concurrent shaping and full thermal curing saves time, and also results in improved release and better replication of the features of the master plate.

Figure 14:
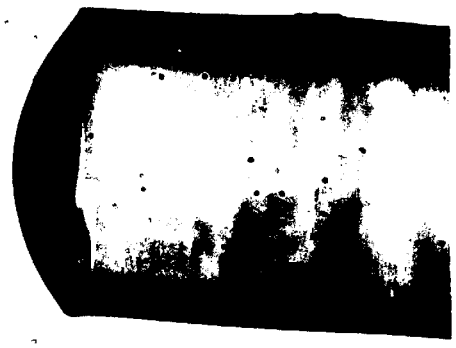
FIG. 14 is a photomicrograph of a device embodying the present invention.
Figure 15:
FIG. 15 is a photomicrograph of a device embodying the present invention.
Figure 16:
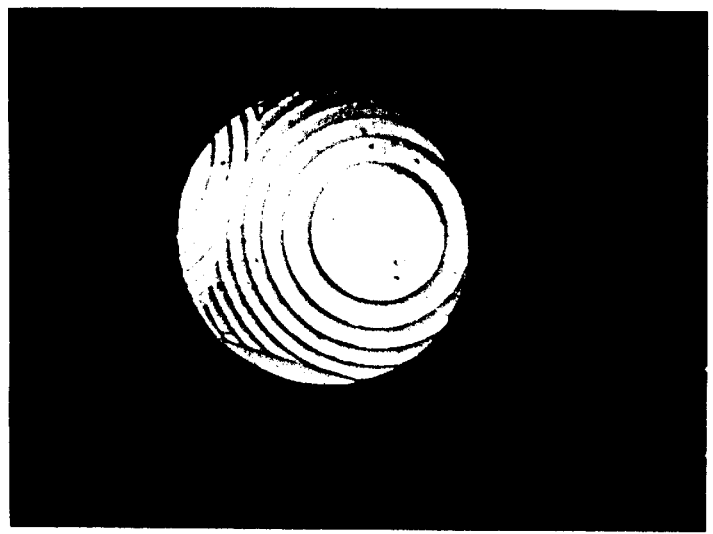
FIG. 16 is a photomicrograph of a device embodying the present invention.
Figure 17:
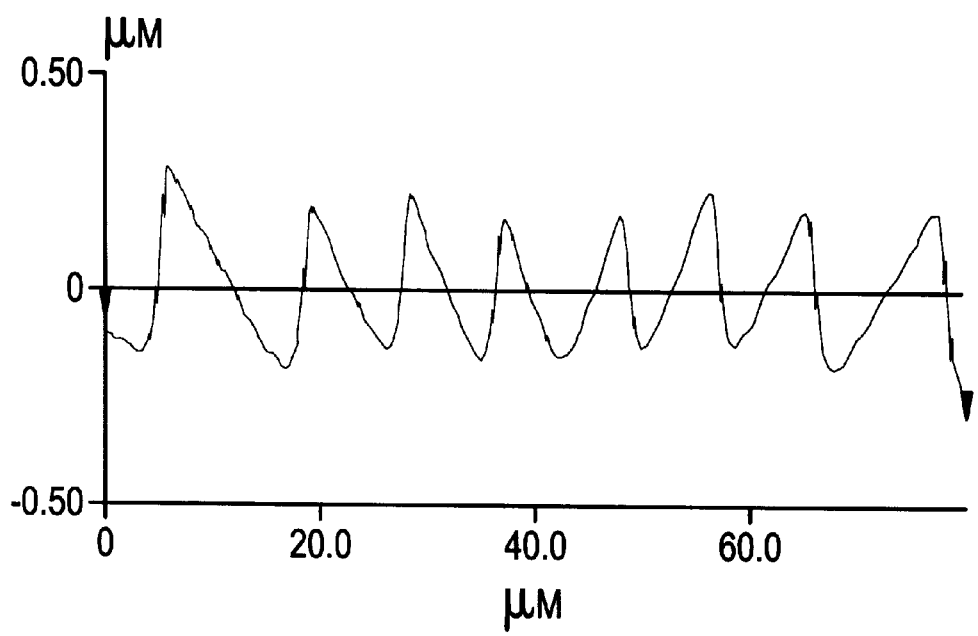
FIG. 17 is an atomic force microscopy plot of the silica master used in the formation of the device of FIG. 14.
Figure 18:
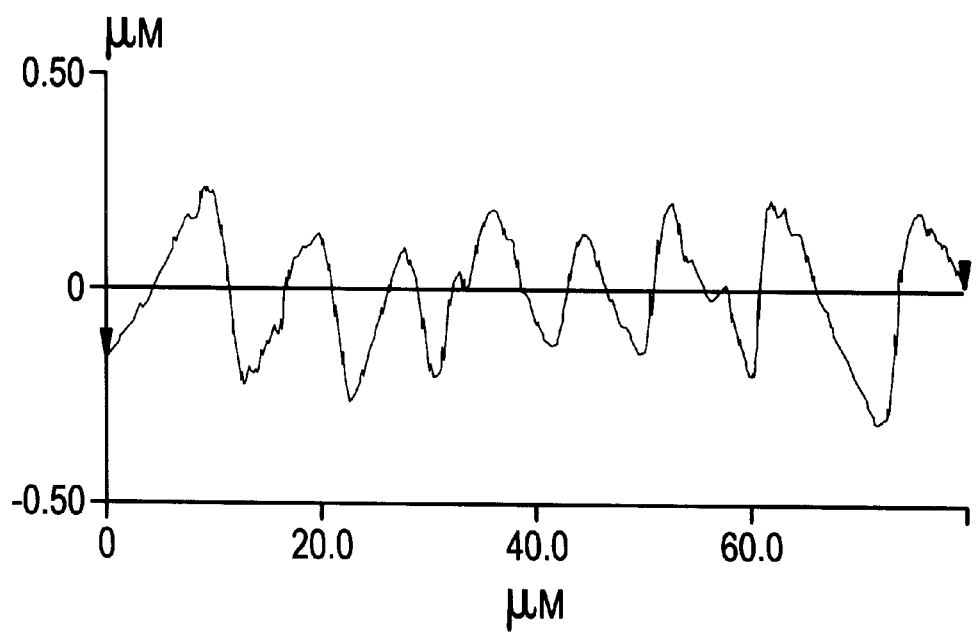
FIG. 18 is an atomic force microscopy plot of the device in FIG. 14.

In practicing the invention, optical elements were formed from a hybrid inorganic-organic sol-gel composition which included phenyltrifluorosilane (PTFS) as the fluoride source along with PDMS, MTES, TES, and $H_2O$. By volume, 0.18 cc of PDMS, 3.89 cc of MTES, 1.30 cc of PTES, and 0.365 cc of PTFS were mixed in a capped container and heated to 75° C. in a hot water bath for about five (5) minutes in order to homogenize the mixture, and then 0.745 cc of $H_2O$ was added to the mixture. The mixture phases separated initially so the mixture was heated to 75° C. and shaken vigorously until the solution was clear (about 20 minutes). The solution was then allowed to react for about three (3) hours before cooling to result in a clear and fluid hybrid inorganic-organic sol-gel composition. FIGS. 14–16 show photomicrographs of optical elements of the invention made by the method with this hybrid inorganic-organic sol-gel composition. FIG. 14 is a side view photomicrograph of an optical fiber with a cured curved lens formed by withdrawing the cleaved fiber end from a bead of the hybrid inorganic-organic sol-gel. This curved lens optical element was heated to 250° C. in an oven to fully cure, and was not embossed or molded with a master. The curved convex piano lens of FIG. 14 has a radius of curvature of about 85 to 88 microns. A convex lens with a designed radius of curvature can be shaped using a mold having an appropriate negative radius of curvature. FIG. 15 is an end view photomicrograph (600×) of an embossed optical element of the invention formed from the same composition used for FIG. 14. The embossed optical element of FIG. 15 is a diffractive grating that was embossed with a nickel master foil. The nickel master foil had a grating pitch of 1 micron and a depth of 0.3 microns (micro pattern features). Additionally scratches were present on the nickel master. FIG. 15 clearly shows that both the 1 micron grating spacing and scratches of the master were replicated in the embossed optical surface of the optical element. FIG. 16 is an end view micrograph (400×) of an embossed optical element of the invention which was made using the same composition. The pitch of the micro pattern features of the diffractive optical lens are larger and the depth greater than that of FIG. 15. The embossed optical element of FIG. 16 was provided by embossing with a diffractive lens silica master plate having a micro feature peak to valley depth of 0.4 microns, and a pitch of about 7 microns. The center lenslet (inner circle) has a diameter of about 50 microns. The embossed optical element of FIG. 16 was analyzed by atomic force microscopy, and compared directly to the master plate and displayed good replication. FIGS. 17 and 18 provide a comparison of the embossed optical element shape with the same corresponding shape of the silica master. FIG. 17 is the atomic force microscopy results plot of the silica master and FIG. 18 is the corresponding plot for the embossed optical element.

In FIG. 17, the master has sharply defined micro pattern features and low noise levels. The peak to valley depths are about 0.3651 $\mu$m, each ring has an 80° slope on the edge facing the center of the circular pattern feature, and an 86.5° slope on the edge facing away from the centers. The profile of the replicated embossed diffractive optical element of FIG. 18 replicates all of the features in negative relief, along with some noise (peak to valley heights average 0.38 microns, and descending slope is 86.5°).

It has been found that with the compositions of hybrid inorganic-organic sol-gels that the exclusion of methyl groups and their replacement by ethyl groups provides for the lowest optical loss at 1550 nm. Particularly the replacement of methyl triethoxysilane (MTES) with ethyl triethoxysilane and the exclusion of photocurable methacryloxypropyl siloxanes provides for lower optical loss at 1550 nm. Thus in regard to the use of triethoxysilanes in the invention, ethyl triethoxysilane is preferred, particularly with optical elements having relatively long optical paths such as collimators made using the beam expanding housing. But, such exclusion of methyl groups necessitates thermal curing of the compositions.

The preferred collimator of the invention is embodied in optical waveguide device 20 of FIG. 5c. Housing 35 houses fiber 22 including fiber terminal end 24. Conical optical element receiving void 29 supports and contains the hybrid sol-gel rod lens of optical element 26 that carries the expanding beam 38 and includes insitu shaped optical surface 32.

For particular applications of collimator optical waveguide device 20, either with the preferred beam expander housing 35 (FIG. 7) or without beam expander housing 35, the lens design of optical element 26 is developed in conjunction with beam diameter, free space propagation length, and divergence limits. Such optical development/design includes the radius of curvature of the shaped lens, the indices of refraction for the beam expansion medium and the lens, and the distance of beam expansion (fiber end to lens surface). To achieve typical divergence and coupling loss requirements, such lens parameters must be controlled, and the present invention provides for such control.

In the preferred beam expander housing embodiment, for a collimator with a 2 cm throw and 0.2 dB coupling loss a design with the following parameters and tolerances is required:

| Lens radius of curvature | 0.550 nm | +/- 0.01 |
| Fiber to lens distance | 1.767 mm | +/- 0.002 |
| Index | 1.465 | +/- 0.001 |

The preferred beam expander housing embodiment is able to achieve these tolerances required for precision optical applications while being economical to make in terms of manufacturing time and difficulty, and material costs. In view of the increased optical path length through the hybrid sol-gel medium, the hybrid sol-gel material should have low loss, preferably <0.1 dB/cm. The ethylsiloxane based hybrid sol-gel compositions of the invention are preferred because of their intrinsic losses of <0.1 B/cm. Such use of the ethylsiloxane containing hybrid sol-gel compositions makes heat treating the preferred form of curing the hybrid sol-gel.

A hybrid sol-gel composition containing ethylsiloxane was used to form a collimator with a beam expanding housing. The hybrid sol-gel composition containing ethylsiloxane comprised 62.5 wt. % ethyl triethoxysilane, 14.6 wt. % phenyl triethoxysilane, 6.5 wt. % phenyl trifluorosilane, 2.7 wt. % polydimethylsiloxane, 13.6 wt. % water and was index matched to the core 36 of the optical fiber 22 received in housing 35. Beam expanding housing 35 was a commercially available NEG brand HC type (Reference Number 9710-30E) silica glass microcapillary available from NEG (Nippon Electric Glass Co., Ltd. of Japan). Such a glass beam expanding housing is preferred in that the housing has a low CTE, is optically transparent, and provides a good bond with the optical elements of the invention. Fiber 22 was positioned in housing 35 at the designed distance from the lens surface. This requires highly accurate positioning in that it fixes the length of beam expansion 38. This was achieved by positioning housing 35 next to negative relief lens mold 64. The fiber was then pushed further into housing 34 until it contacted the lens surface of negative relief lens mold 64 and was then retracted with a precision stage to the required design distance. This provided a micron level accuracy for the position of optical fiber terminal end 24 within housing 35. Fiber 22 was then fixed in position within housing 35 by applying a UV curable epoxy to optical fiber receiving end 21 and fiber 22, followed with UV curing. Conical optical element receiving void 29 of housing 34 was then filled with the viscous liquid optical element precursor hybrid sol-gel material. Housing 35 can be filled in multiple steps before molding the lens surface, or can be filled and cured in one step. Housing 35 containing fiber 36 and unshaped partially cured deformable plastic solid optical element precursor 50 is positioned onto the mold by observing the relative position of the mold 64 and housing 35 through transparent mold 64. Centering accuracy within a few microns was achieved by viewing through the bottom of transparent mold 64 with a telescopic lens system. Optical element 26 and shaped lens surface 32 is formed by shaping with mold 64 and fully curing the shaped hybrid sol-gel material.

The making of collimators utilizing housing 35 is preferred in that optical element receiving void 29 provides a relatively large conic section so expanded beam diameters up to about 500 microns can be achieved without truncating, thus enabling the manufacture of collimators with a 10 cm throw.

Figure 19:
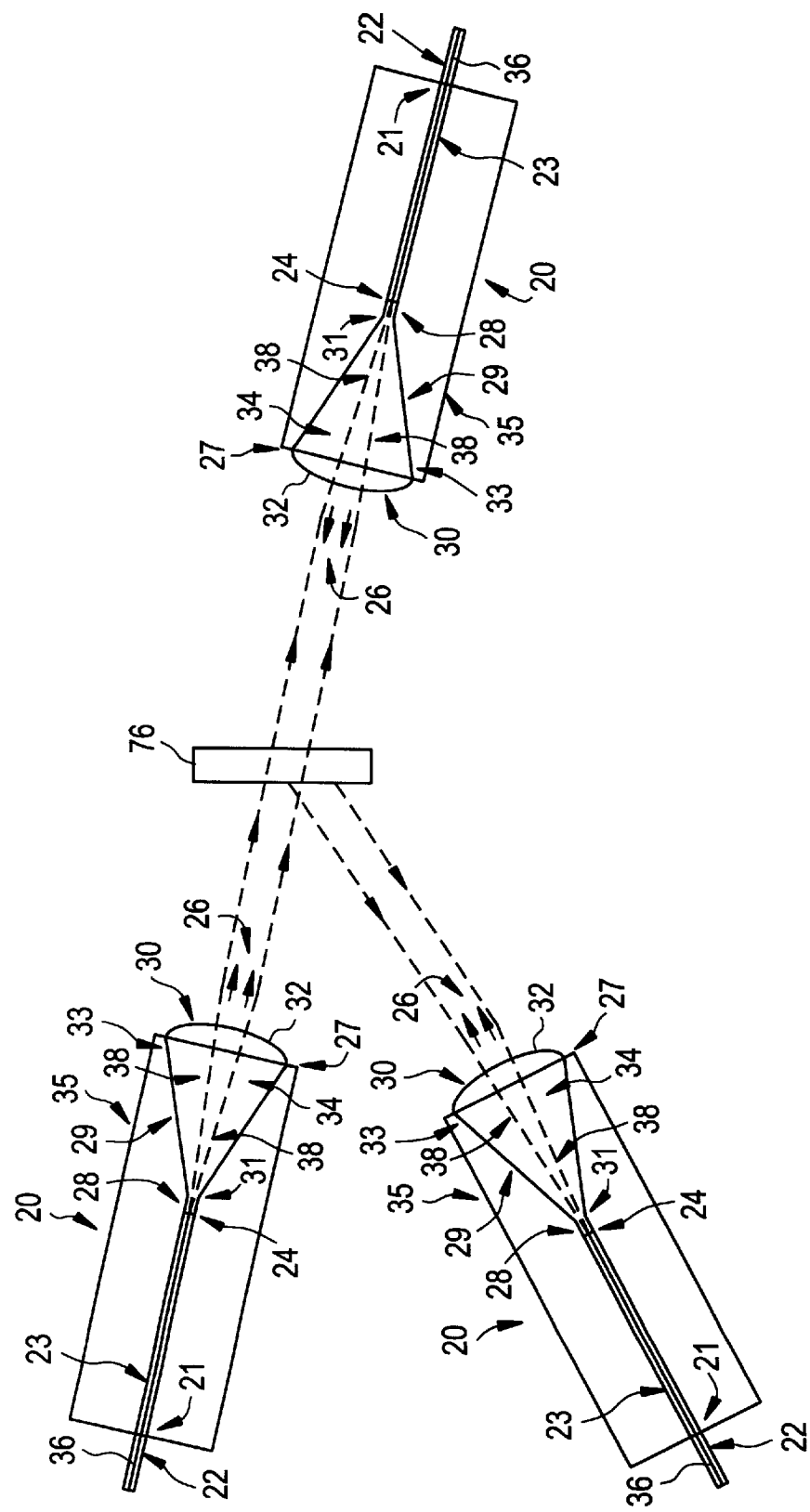
FIG. 19 is a diagram of the present invention used as an optical fiber collimator in which the light beam transmitted through the optical fiber and shaped optical element is incident on an optical device and subsequently received by a second optical element and optical fiber.

Referring particularly to FIG. 19, one embodiment of the present invention is shown being used as an optical fiber collimator in which the light beam transmitted through the optical fiber 20 and shaped optical element 26 is incident upon and transmitted through an optical device 46 such as an isolator, circulator, thin-film filter, or other conventional optical element, and subsequently received by a second shaped optical element 26 and second optical fiber 20 on the opposing side of the optical device 46. Conversely, all or a portion of the beam may be reflected by the optical device 46 and received by a second shaped optical element 26 and optical fiber 20 serving as a second collimator on the same side of the optical device 46 as the first collimator.

The method and optical elements provide an optically functional terminus at the end of an optical fiber. The optical element can take the shape of a lens, a diffractive element, an angle taper, or other functional form. The optical elements can incorporate shapes to minimize back reflectance or to maximize light coupling into the fiber. Light coupling with the optical element can include difficult applications such as when mode field mismatched waveguides must be coupled or when a diffuse light source such as a diode laser is coupled into the fiber. The embossing techniques of the invention can provide micro pattern features ranging from sub-micron grating patterns to diffractive lens elements having features as large as 3 to 50 microns.

It will be apparent to those skilled in the art that various modifications and variations can be made in the devices and methods of the present invention without departing from the spirit or scope of the invention. Thus, it is intended that the present invention cover the modifications and variations of this invention provided they come within the scope of the appended claims and their equivalents.

What is claimed is:

1. A collimator assembly for use with an optical fiber carrying a light signal to be projected as a generally collimated beam to an optically-functioning element, the optical fiber having a terminal end, the collimator assembly comprising:

a ferrule for receiving the terminal end of the optical fiber, the ferrule defining a cavity; and an optical element for collimating the light signal projected from the terminal end of the optical fiber, the optical element being at least partially a,received within the cavity, a portion of the optical element being disposed in close proximity to the terminal end of the optical fiber so as to receive the light signal emitted from the terminal end of the optical fiber, the optical element defining a shaped optical surface confronting and spaced apart from the optically-functioning element;

wherein the optical element has a cross section which is greater at the shaped optical surface confronting the optically-functioning element than at the portion at close proximity to the terminal end of the optical fiber, and the optical element generally uniformly expands in the direction from the fiber to the shaped optical surface; and wherein the optical element is a nondeformable plastic solid cured from a deformable plastic solid, the deformable plastic solid being partially cured from a precursor liquid having a volume V1, the precursor liquid being generally viscous and solvent-free, the nondeformable solid having a volume V3 and the deformable plastic solid having a volume V2, and further wherein the volume V2 of the deformable plastic solid is generally greater than or equal to about 0.95 times the volume V1 of the precursor liquid, and the volume V3 of the nondefornable solid is generally greater than or equal to about 0.90 times the volume V1 of the precursor liquid and about 0.95 times the volume V2 of the deformable plastic solid.

2. The collimator assembly of claim 1 wherein the optical element has a cross-section, the cross-section being greater at the shaped optical surface confronting the optically-functioning element than at the portion disposed in close proximity to the terminal end of the optical fiber.

3. The collimator assembly of claim 1, wherein the cross-section is generally conical.

4. The collimator assembly of claim 1, wherein the nondefornable plastic solid has a mass ND and the deformable plastic solid has a mass D, and further wherein the mass ND of the nondefornable plastic solid is generally less than or equal to the mass D of the deformable plastic solid, but the mass ND of the nondeformable plastic solid is generally greater than or equal to about 0.95 times the mass D of the deformable plastic solid.

5. The collimator assembly of claim 1, wherein the precursor liquid was obtained from a solvent-containing liquid having a volume V0, wherein the volume V1 of the precursor liquid is generally less than or equal to about one half the volume V0 of the solvent-containing liquid.

6. The collimator assembly of claim 1, wherein the optical element contacts and is adhered to the terminal end of the optical fiber.

7. The collimator assembly of claim 1, wherein the shaped optical surface of the optical element defines features transferred to the shaped optical surface from a pattern selected from a group consisting of a relief mold or a negative master plate.

8. The collimator assembly of claim 1, wherein the optical element is selected from a group consisting of a lens, a collimator, a beam expander, a waveguide having an expanded core, an optical taper angle, or a diffraction grating.

9. The collimator assembly of claim 1, wherein the optical element is formed from a sol-gel material.

10. The collimator assembly of claim 9, wherein the sol-gel material is an inorganic-organic hybrid sol-gel material.

11. The collimator assembly of claim 10, wherein the inorganic-organic hybrid sol-gel material is an extended matrix containing silicon atoms and oxygen atoms, with at least a fraction of the silicon atoms in the extended matrix being directly bonded to either substituted or unsubstituted hydrocarbon moieties.

12. The collimator assembly of claim 11, wherein at least 1% of the silicon atoms are covalently bonded to at least one organic modifier, said modifier having an organic group of from 1 to 18 carbon atoms.

13. The collimator assembly of claim 12, wherein the organic group is selected from a group consisting of an alkyl, a phenyl, an aryl, or a methyl.

14. The collimator assembly of claim 10, wherein the inorganic-organic hybrid sol-gel material is formed from at least one precursor selected from the group consisting of a polydimethyl siloxane, an alkyl triethoxysilane, ethyltriethoxysilane, methyltriethoxysilane, a phenyltriethoxysilane, a methacryloxypropyl trialkoxysilane, or a structural modifier including at least one fluorine atom.

15. The collimator assembly of claim 14, wherein the structural modifier is phenyltriflourosilane (PTPS).

16. The collimator assembly of claim 10, wherein the inorganic-organic hybrid sol-gel material is includes alkyl-siloxane groups, phenyl-siloxane groups, and fluorine.

17. The collimator assembly of claim 9, wherein the sol-gel material includes an UV-curable alkoxysilane and a photoinitiator.

18. The collimator assembly of claim 17, wherein the UV-curable alkoxysilane is methacryloxypropyl silane.

19. A method for making an optical component utilizing an optical fiber having a terminal end, the method comprising the steps of:

providing the optical fiber having the terminal end;

adhering a viscous liquid inorganic-organic hybrid sol-gel precursor to the terminal end of the optical fiber;

partially curing the precursor to form a deformable plastic solid optical element;

shaping the deformable plastic solid optical element to define an optical surface;

and fully curing the deformable plastic solid optical element into a nondeformable solid optical element wherein said precursor comprises a material selected from the group consisting of polydimethyl siloxane, alkyl triethoxysilane, phenyltriethoxysilane, methacryloxypropyl trialkoxysilane, or phenyltrifluorosilane (ETNS).

20. The method of claim 19, wherein the step of adhering the precursor to the terminal end of the optical fiber further comprises the steps of:

providing a housing having an optical fiber receiving section and an optical clement receiving section;

inserting the terminal end of the optical fiber into the optical fiber receiving section of the housing; and at least partially filling the optical element receiving section of the housing with the precursor.

21. The method of claim 19, wherein the precursor includes an U-Vurable alkoxysilane with a photoinitiator, and the step of partially curing the precursor includes exposing the precursor to UV radiation.

22. A The method of claim 21, wherein the UV-curable alkoxysilane is methacryloxypropyl trialkoxysilane.

23. A method as claimed in claim 19, wherein the step of providing the optical fiber having the terminal end comprises the steps of:
providing a first optical fiber;
cleaving the first optical fiber;
fusion splicing a second optical waveguide to the first optical fiber; and
cleaving the second optical waveguide to form the terminal end of the optical fiber.

24. The method of claim 19, wherein the inorganic-organic hybrid sol-gel has an extended matrix containing silicon atoms and oxygen atoms, with at least a fraction of the silicon atoms being directly bonded to either substituted or unsubstituted hydrocarbon moieties.

25. The method of claim 24, wherein at least 1% of the silicon atoms are covalently bonded to at least one organic modifier, said modifier being an organic group having 1–18 carbon atoms.

26. The method of claim 19, wherein the inorganic-organic hybrid sol-gel includes methacryloxypropyl siloxane groups.

27. The method of claim 19, wherein the step of providing the precursor further comprises the steps of:
providing a first chemical composition
hydrolyzing the first chemical composition to form a hydrolyzed sol fluid liquid; and
drying the hydrolyzed sol fluid liquid to produce the precursor.

28. The method of claim 27, wherein the hydrolyzed sol fluid liquid has a mass, the first chemical composition has a mass, and the precursor has a mass, the mass of the precursor being less than about 50% of either the mass of the hydrolyzed sol fluid liquid or the mass of the first chemical composition or both.

29. The method of claim 27, wherein the precursor has a mass, and further wherein less than 6% of the mass of the precursor is lost in a solid state.

30. The method of claim 19, wherein the precursor has a mass and the deformable plastic solid optical element has a mass, the mass of the deformable plastic solid optical element being at least about 94% of the mass of the precursor.

31. The method of claim 19, wherein the precursor has a mass and the nondefornable solid optical element has a mass, the mass of the nondeformable solid optical element being at least about 90% of the mass of the precursor.

32. The method of claim 19, wherein the step of adhering the precursor to the terminal end of the optical fiber comprises:
contacting the terminal end with the precursor so that the precursor fully wets the terminal end and forms a convex meniscus.

33. The method of claim 19, wherein the step of shaping the deformable plastic solid optical element is performed by a process selected from the group consisting of embossing, molding, or patterning with a negative master plate, patterning with an etched negative relief.

34. The method of claim 19, wherein the steps of shaping the deformable plastic solid optical element and fully curing the deformable plastic solid optical element into a nondeformable solid optical element are performed concurrently.

35. The method of claim 19, wherein the steps of shaping the deformable plastic solid optical element and fully curing the deformable plastic solid optical element into a nondeformable solid optical element are performed consecutively.

36. The method of claim 19, wherein the step of fully curing the shaped deformable plastic solid optical element comprises:
heating the shaped deformable plastic solid optical element for a time at a temperature sufficient to cure the shaped deformable plastic solid optical element into a nondeformable solid optical element.

37. The method of claim 36, wherein the heating step is performed for at least 3 minutes at a temperature of at least about 150° C.

38. The method of claim 37, wherein the temperature is in the range of about 150° C. to about 325° C.

39. The method of claim 37, wherein the temperature is in the range of about 180° C. to 250° C.

40. The method of claim 37, wherein the time is in the range of about 3 minutes to about 7 minutes.

41. The method of claim 37, wherein the time is in the range of about 4 minutes to about 6 minutes.

42. The method of claim 19, wherein the step of shaping the deformable plastic solid optical element includes contacting the deformable plastic solid optical element with a heated negative master plate.

43. The method of claim 42, wherein the heated negative master plate has a temperature of at least 200° C.

44. A method for making an optical component utilizing an optical fiber having;a terminal end, the method comprising the steps of:
providing the optical fiber having the terminal end;
adhering a viscous liquid inorganic-organic hybrid sol-gel precursor to the terminal end of the optical fiber;
partially curing the precursor to form a deformable plastic solid optical element;
shaping the deformable plastic solid optical element to define an optical surface; and
fully curing the deformable plastic solid optical element into a nondeformable solid optical element
wherein the inorganic-organic hybrid sol-gel includes phenyl-siloxane groups, fluorine, and either ethylsiloxane groups or methyl-siloxane groups.

* * * * *

UNITED STATES PATENT AND TRADEMARK OFFICE
CERTIFICATE OF CORRECTION

PATENT NO. : 6,488,414 B1
DATED : December 3, 2002
INVENTOR(S) : Dawes et al.

It is certified that error appears in the above-identified patent and that said Letters Patent is hereby corrected as shown below:

Column 16,
Line 28, "(PTPS)" should be listed as -- (PTFS) --
Line 55, "(ETNS)" should be listed as -- (PTFS) --
Line 67, "U-Vurable" should be -- UV-curable --

Signed and Sealed this

Eleventh Day of March, 2003

JAMES E. ROGAN
*Director of the United States Patent and Trademark Office*